R. H. BROWN.
WIRE STITCHING MACHINE.
APPLICATION FILED JUNE 16, 1906.
923,134.
Patented June 1, 1909.
3 SHEETS—SHEET 2.
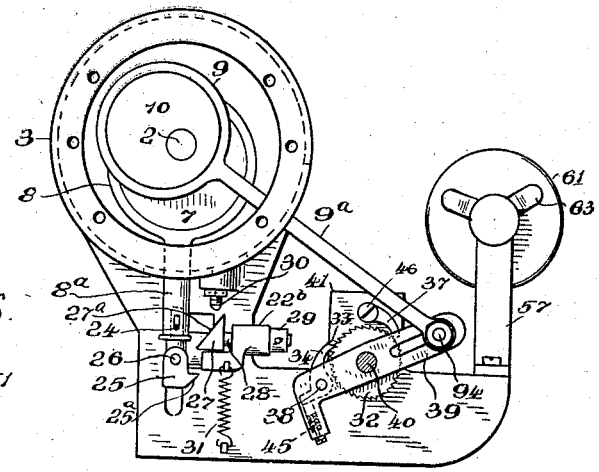
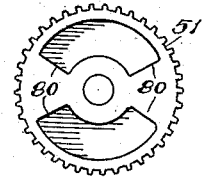
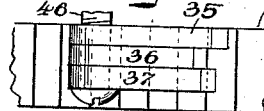
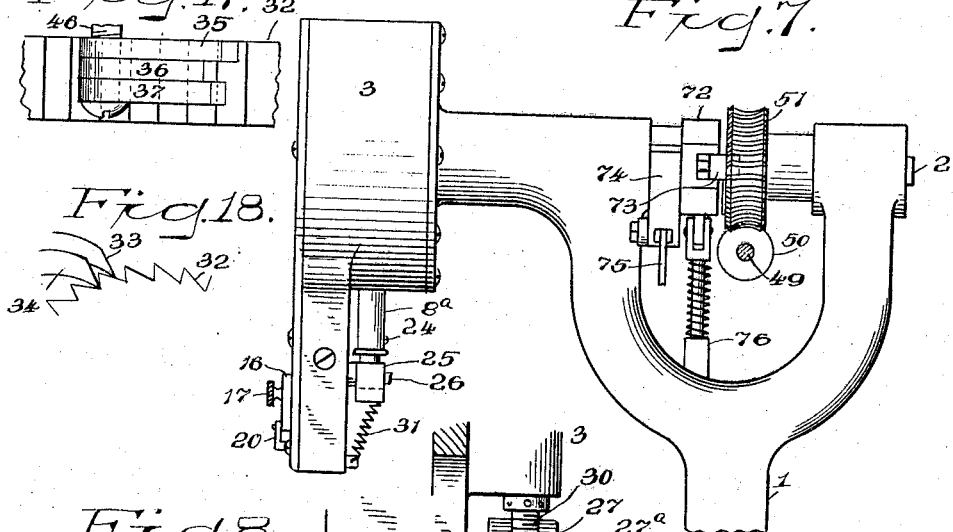
WITNESSES
H. A. Lamb
E. H. Metcalf
INVENTOR
Reuben H. Brown
BY Geo. D. Phillips
his ATTORNEY R. H. BROWN.
WIRE STITCHING MACHINE.
APPLICATION FILED JUNE 16, 1906.
923,134.
Patented June 1, 1909.
3 SHEETS—SHEET 3.
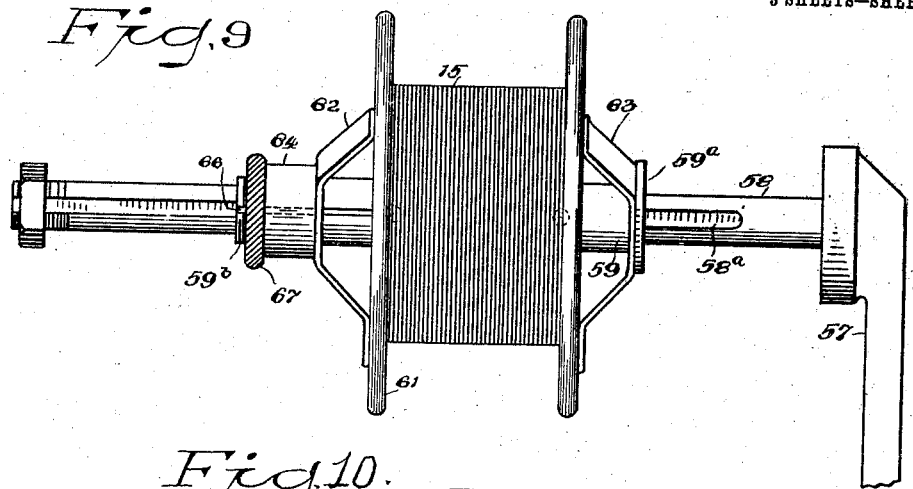
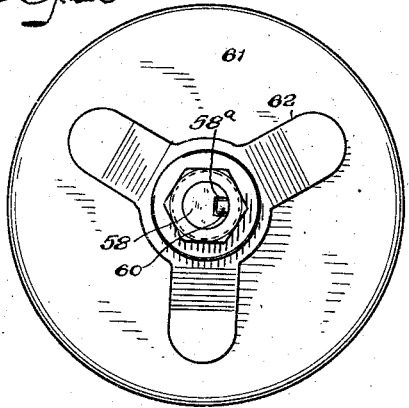
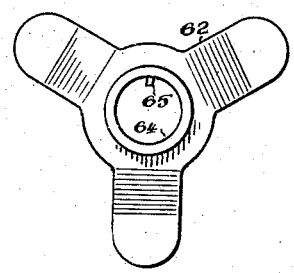
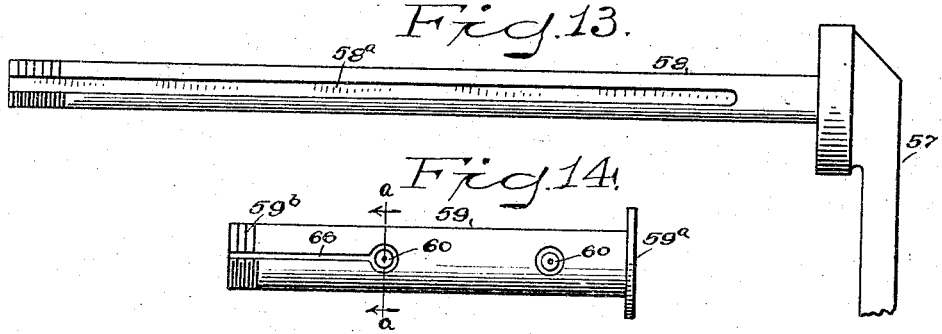
WITNESSES
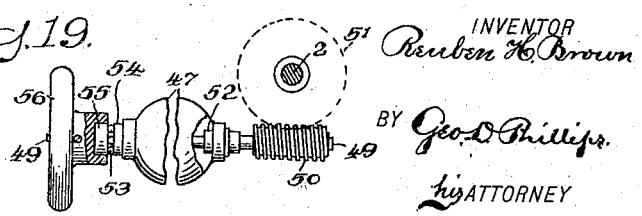
INVENTOR
Reuben H. Brown
BY Geo. D. Phillips.
his ATTORNEY

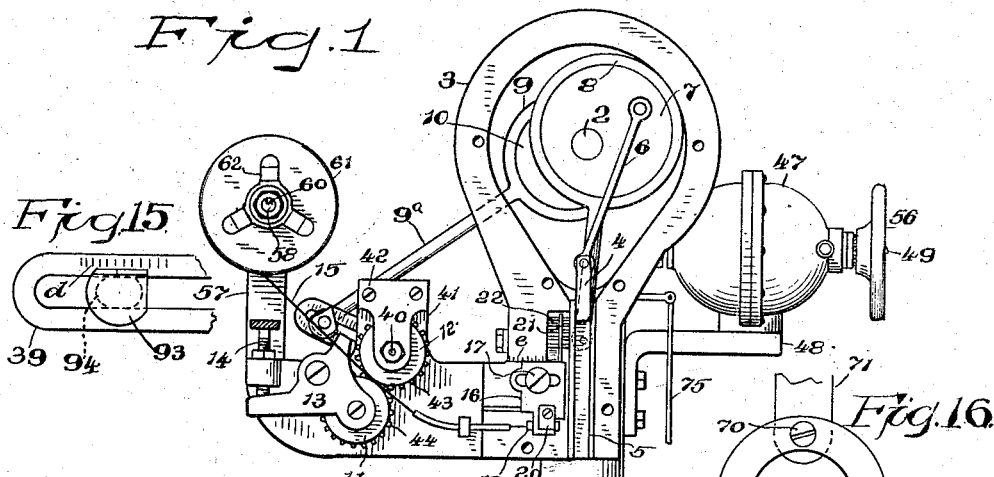

UNITED STATES PATENT OFFICE.

REUBEN H. BROWN, OF NEW HAVEN, CONNECTICUT.

WIRE-STITCHING MACHINE.

No. 923,134.

Specification of Letters Patent.

Patented June 1, 1909.

Application filed June 16, 1906. Serial No. 321,981.

*To all whom it may concern:*

Be it known that I, REUBEN H. BROWN, a citizen of the United States, and a resident of New Haven, in the county of New Haven and State of Connecticut, have invented certain new and useful Improvements in Wire-Stitching Machines, of which the following is a specification.

My invention relates to certain improvements in wire-stitching machines.

To enable others to understand my invention reference is had to the accompanying drawings in which:

Figure 1—represents a front elevation of the upper part of the machine with the front plate of the head removed, broken view of the treadle-rod; supporting standard, and wire staple driving-bar: Fig. 2—is an enlarged broken sectional view of the supporting standard, and broken view of the vertically operating shank of the clencher block holder, and cam for actuating and supporting the same: Fig. 3—is an enlarged broken detail view of the shank of the clencher bar holder and diagram of its supporting cam: Fig. 4—is an enlarged detail upper plan view of the plate used in connection with a measuring scale connected with the supporting cam of the clencher bar holder: Fig. 5—is a rear elevation of the machine head and wire feeding mechanism: Fig. 6—is an enlarged detail view of the worm gear connected with the driving mechanism: Fig. 7—is a side elevation of the machine frame, head secured thereto, broken view of the supporting standard; broken view of the treadle-rod and cross sectional view of the motor shaft: Fig. 8—is an enlarged broken sectional view of the head showing the wire cutting-off mechanism: Fig. 9—is an enlarged detail side elevation of the reel; its sleeve and supporting-rod, and broken view of the rod supporting standard: Fig. 10—is an enlarged detail end elevation of the reel and its sleeve and supporting-rod: Fig. 11—is an enlarged detail cross sectional view of the reel supporting sleeve on line *a a* of Fig. 14: Fig. 12—is an enlarged detail plan view of one of the reel tension springs and collar: Fig. 13—is an enlarged detail view of the supporting-rod for the reel sleeve and broken view of its supporting-bracket: Fig. 14—is an enlarged detail view of the reel supporting sleeve: Fig. 15—is an enlarged detail broken side elevation of the lever connected with the wire feeding mechanism: Fig. 16—is a modification of the reel mechanism and broken view of its support: Fig. 17—is an enlarged broken view of the ratchet-wheel connected with the wire feeding mechanism, and stop pawls therefor: Fig. 18—is an enlarged broken side elevation of the ratchet-wheel connected with the wire feeding mechanism, and broken view of the feeding-pawls: Fig. 19—is a reduced broken view of the motor, a view of the worm on the inner end of the motor shaft, and a view of the motor-shaft handle partly in section located on the outer end of the shaft.

Those parts of the machine which are old will be incidentally referred to in order to show more clearly my several improvements connected therewith. 1 is the ordinary standard in whose upper forked end or frame is journaled the driving-shaft 2. 3 is the front head detachably secured to the frame. 4 is the staple driver operatively mounted in the staple forming bar 5, 6 the link connecting the staple driver with the eccentric 7 on the driving-shaft. 8 is the staple forming bar eccentric strap and 9 the wire feed eccentric strap mounted on the eccentric 10 of the driving-shaft. 11 and 12 are wire feed-rolls, 13 swinging plate on which the roll 11 is mounted, 14 an adjusting-screw to regulate the pressure or grip on the wire 15 as it passes between said rolls.

I will now explain my improved features pertaining to the wire feeding and cutting-off mechanism whereby the wire is positively and accurately fed and so cut off as to avoid bending the ends of the wire to interfere with the proper driving of the staple.

Referring to Figs. 1 and 8, 16 is the longitudinally adjustable cutter-box detachably secured to the head 3 by means of the thumb-screw 17, 18 is the cutting-die through which the wire is fed, and 20 is a clamp to secure the die in any of its adjusted positions. 21 is the cutter operatively mounted in the cutter box and it is carried by said box in its longitudinal adjustments. The upper end of the cutter is provided with the rack teeth 21$^a$. 22 is a rocking lever pivotally mounted on the screw 23, and 22$^a$ are teeth on the front end of this lever adapted to mesh with the teeth of the before mentioned cutter. This lever is made wide enough so that the teeth thereon will be of sufficient length to cover the full lateral range of movement of the cutter due to the longitudinal shifting of the cutter-box 16. In the lower end of the arm 8ª of the staple forming bar eccentric strap 8, is inserted and adjustably secured by the screw 24, the shank portion of the cutter lever trip 25, as shown at Figs. 5 and 7. 26 is a pin projecting rearward from the staple forming bar 5, Fig. 1, which pin is journaled in the head portion of the cutter lever trip and, through the medium of which trip, the staple forming bar is vertically operated. 27, see also Fig. 8, is the head portion of the sliding bolt 28 longitudinally operating in the extension 22ᵇ of the rocking-lever 22. A spring—not shown—in this extension keeps the head of this bolt normally in the path of the lip 25ᵃ of the trip 25, and the collar 29 temporarily maintains that position. When, therefore, the trip 25 is being carried up to elevate the staple forming bar, its lip 25ᵃ engages the under side of the head 27 of the bolt 28 to actuate the rocking-lever 22 so as to depress its tooth carrying end and force down the cutter 21 whose tapered cutting end 21ᵇ will shear off a section of the wire to form a staple close to the inner face of the cutting-die, and, by reason of the fact that, as the cutter can be so nicely adjusted with respect to the face of the cutting-die, there will be no tendency to bend the end of the severed section of wire to interfere with its being readily driven into the book. When the wire is severed, the incline face 27ᵃ of the head 27 will have been brought into contact with the round pointed screw 30, adjustably mounted in the head 3, and be forced back out of engagement with the trip 25 and permit said trip to complete its upward movement, whereupon said head will be again carried forward by its spring, not shown. When the trip descends with the staple forming bar, the incline faces of the trip and head 27 will again temporarily force back the bolt 28 so as to permit the uninterrupted descent of said trip for the formation of the wire staple. 31 is a spring connected to the rear end of the rocking-lever 22 and the machine-head to maintain the normal elevation of the wire-cutter. It will thus be readily seen that the downward travel of the cutter is regulated by the position of the adjustable stop 30, for the higher up this stop is placed, the longer will be the lifting engagement of the trip 25 with the head 27, and the farther down the cutter will travel before this engagement is broken, and, as before mentioned, the tendency to bend the wire in cutting is entirely obviated by the shearing effect of the cutter and the readiness with which it can be operatively adjusted with respect to the face of the cutting-die.

The improved feature of the wire feeding mechanism comprises the ratchet-wheel 32, Figs. 5, 17 and 18, combined with the feeding pawls 33 and 34, and the stop pawls 35, 36 and 37. The feeding pawls are pivotally supported on the screw 38 secured to the lever 39, which lever is loosely mounted on the shaft 40 journaled, see also Fig. 1, in the projection 41 and the bracket 42. The upper feed roll 12 is secured to this shaft and has a working connection with the lower feed-roll 11 through the medium of the gears 43 and 44. The lever 39 is reciprocated through the medium of the arm 9ª of the eccentric strap 9 as before mentioned.

The engagement of the feeding pawls 33 and 34 with the ratchet-wheel is maintained by springs engaging said pawls on the opposite side of their pivotal support. One of these springs, 45, being shown in dotted position in the lever 39 at Fig. 5. Referring to Fig. 18, it will be observed that the pawl 33 is in advance of the pawl 34, a distance equal practically to one-half of the pitch of the ratchet-wheel 32 whereby a fine feed can be obtained with a coarse toothed wheel.

The stop pawls 35, 36 and 37 Figs. 5 and 17, are pivotally mounted on the screw 46 and in such a position with respect to the ratchet-wheel that they are maintained in contact therewith entirely by gravity. It will be observed that these three stop pawls are of different lengths which practically subdivides the pitch of the tooth of the wheel into three equal parts so that, one of these pawls will always be engaged with a tooth to prevent the backward rotation of the wheel, and thus insure an exact and correct feeding of the wire irrespective of the travel of the feeding-pawls. The travel of the feeding-pawls for feeding forward the wire a distance to represent the various lengths of wire to form the different staples required is effected by the position which the arm 9ª occupies on the lever 39. Therefore, having set this arm in a certain position to feed forward a predetermined length of wire to form a staple, it is imperative that this length be not shortened by the backward rotation of the feed-rolls, and this is effectually prevented by my differential stops.

In place of driving the machine by a belt as was formerly done, and which gives more or less trouble by slipping, I employ an electric motor and which must necessarily be a small one in order that it may be attached directly to the machine and become a permanent part thereof. To obtain the necessary power from a small motor that can thus be readily attached, it must be run at a high velocity, and my improvement in connection therewith relates to the manner of connecting it with the machine so as to transmit a reduced speed to the driving shaft of the machine without impairing in the least the efficiency of the motor. A further improvement relates to the means for counteracting the wear due to the end thrust of the motor-shaft.

Referring to Fig. 1, 47 represents a small high power electric motor mounted on the bracket 48 secured to the machine. 49, Figs. 7 and 19, is the motor-shaft carrying the multiple worm 50 to mesh with the worm gear 51 mounted on the driving-shaft 2. This arrangement of the multiple threaded worm and the worm-wheel will permit the motor to maintain its high velocity while the driving-shaft will rotate at the proper speed required for book stitching purposes. When the power is applied to the machine, the end thrust of the motor shaft will bring the collar or shouldered portion 52, Fig. 19, hard against the forward inside end wall of the motor and wear the same to the great detriment of the motor. To obviate this wearing tendency, I place the ball bearing 53 between the end of the steel block 54 abutting the hub of the motor, and the steel block 55 let into the hub of the hand-wheel 56 mounted upon the motor-shaft 49, which arrangement will entirely remove or counteract the before mentioned end thrust.

Another improvement in my machine relates to the reel whereby the wire is delivered therefrom and always in a direct line to the point where a section is cut to form the staple without being twisted or distorted. When the reel occupies a fixed position, most of the wire is reeled off at an angle to the feed-rolls and the quill or cutting-off die. This angular delivery of the wire, under more or less torsional strain, will cause the severed piece to re-act and assume a position detrimental to the formation of a correct staple when engaged by the staple forming bar. To overcome the tendency of the severed wire to creep or change its position, I have so mounted the reel that it can have a longitudinal as well as a rotary movement on its support as follows: 57, Figs. 1, 9 and 10, is a bracket adapted to be secured to the off-set portion of the machine head and in rear of the feed-rolls, 58 is a rod rigidly secured to the upper end of this bracket and having the long key-way or channel 58$^a$ formed therein. 59 is a sleeve, see also Figs. 11 and 14, mounted on the rod 58 and it is adapted to have a free longitudinal movement thereon, but it is prevented from rotating by means of the rolls 60, Figs. 10, 11 and 14, engaging with the sides of the channel 58$^a$. While this roll keeps the sleeve 59 from turning, it also prevents friction, so that the sleeve will reciprocate freely on the rod 58. 61 is a reel rotatably mounted on the sleeve 58. 62 and 63 are spider tension springs loosely mounted on said sleeve and they are located between the head 59$^a$ of the sleeve and one side of the reel, and the collar 64 and the opposite side of said reel. These springs rotate with the reel and serve as a brake against rotating too rapidly. The collar 64 is held against rotation on the sleeve by means of the key 65, Fig. 12, freely engaging the slot 66 in the sleeve 59. 67 is a tension adjusting nut mounted upon the threaded portion 59$^b$ of the sleeve.

From the foregoing description it will readily be seen that, as the wire 15 is delivered from the reel by the pulling action of the feed-rolls, it can follow only in a straight line, for the slightest tendency to an angular pull will be instantly counteracted by the lateral shifting of the sleeve carrying reel 59.

In the modified construction shown at Fig. 16, the reel 61$^a$ is rotatably mounted on the shaft 68 secured in the upper ends of the U shaped frame 69. This frame is pivotally mounted on the screw 70 of the stationary support 71. In this construction the frame swings on its pivotal support to counteract the angular pull of the wire and carries the reel with it, the reel rotating while the wire is being delivered but the spider tension springs 62$^a$ and 63 remain stationary.

With the exception of the substitution of the worm gear 51 on the driving shaft 2, Fig. 7, the remaining mechanism on said shaft, viz: the clutch-cam 72 carrying the clutch-cam bolt 73; the knock-off 74 for said bolt actuated by the treadle-rod 75; the clencher cam rod 76 whose lower end, not shown, engages with the opposite end, not shown, of the clencher lever 77, see also Fig. 1, the clencher plunger 78 whose lower end is pivoted to this lever and whose upper end actuates the clenchers, not shown, in the clencher-block 81, are all old and well known in machines of this character and, therefore, need no further reference. With respect, however, to the worm gear 51, see Fig. 6, the face of said gear is provided with the clutch faces 80 adapted to engage with the clutch cam bolt 73, Fig. 7, whereby motion is communicated from the worm gear to the driving shaft.

Another improved feature comprises mechanism whereby the table is vertically adjusted and accurately maintained in any of its adjusted positions. Referring to Figs. 1, 2 and 3, 81 is the clencher-block upon which the table, not shown, is supported. 82 is the clencher block holder having the shank 82$^a$ vertically operating in the projection 1$^a$ of the standard 1. 83 is a cam or eccentric secured to the shaft 84 journaled in the side wall of the projection 1$^a$. 85 is a collar longitudinally movable and nonrotatably mounted on said shaft and having the holes 86 for the insertion of a tool whereby said shaft and eccentric are rotated. 87 is a flange integral with the eccentric and concentric with the shaft, and 88 is a handle mounted on the threaded portion 84ᵃ of the shaft. By means of the collar 85, as before mentioned, the eccentric and shaft are rotated, and by means of the handle 88 the shaft and eccentric are held firmly against rotation by clamping the inner faces of the flange 87 and collar 85 against the outer and inner side walls of the projection 1ᵃ. The lower portion of the shank 82ᵃ of the clencher block holder is cut away to admit the eccentric 83. The upper wall 89, Fig. 3, of this cut-away portion is formed at such an angle that its point of contact with the eccentric is always directly in vertical alinement with the shaft 84 regardless as to what may be the rotatable position of the eccentric or cam 83.

It will thus be seen that, while the eccentric provides means for an easy and minute vertical adjustment of the clencher block holder and table, such parts will always remain rigid in such adjusted position during the operation of stitching, as their weight and downward pressure is at all times over the shaft 84.

The peripheral face of the flange 87 is provided with the graduations or scale $c$, which, with the indicator 90, Figs. 1 and 4, gives a reading for the purpose presently to be described.

Having first determined the thickness of the book to be stitched it is placed between the jaws formed by the lip 91 of the projection 1ᵃ, Fig. 2, and the lug 92 secured to the shank 82ᵃ of the clencher block holder. Then the eccentric 83 is rotated to actuate the shank 82ᵃ and close the said jaws on to the book. This done, the eccentric is secured against further rotation by the handle 88, as before mentioned. A reading of the scale $c$ is then taken, and the head 93, Figs. 1 and 15, of the bolt 94, is shifted to a position on the scale $d$, on the feed-lever 39, to correspond to the graduation mark on which the eccentric 83 is set so that, the feed-lever 39 will actuate the feed-rolls to feed forward a suitable amount of wire to form a staple of sufficient length for the book. The cutter-box 16 is also adjusted longitudinally and set to a graduation mark on the scale $e$ to bring said cutter-box in the proper relation with the staple forming bar 5 so that the legs of the proposed staple will be of equal length.

Having thus described my invention what I claim as new and desire to secure by Letters Patent is:

1. In a wire stitching machine, a toothed faced rocking lever, a toothed faced wire cutter meshing therewith so that said cutter may be vertically adjusted to compensate for wearing away of its cutting edge, an actuated trip, means on said rocking lever to be engaged with said trip to actuate the wire cutter, and means for disengaging the rocking lever from the trip after the cutter has performed its work, for the purpose set forth.

2. In a wire stitching machine, the combination with the staple forming bar eccentric strap, of a trip adjustably connected therewith, a wire cutter actuating rocking lever, a taper headed spring actuated bolt on said rocking lever and normally lying in the path of the trip, and adjustable means for automatically disengaging said bolt from the trip, for the purpose set forth.

3. In a wire stitching machine, the combination with the staple forming bar and a trip connected therewith, of a rocking-lever, a wire cutter, a toothed connection between said cutter and rocking-lever, means for effecting a lateral adjustment of said cutter while it is engaged with the rocking-lever, a taper-headed spring-actuated bolt on said rocking-lever and normally lying in the path of the trip, means for automatically disengaging said bolt from said trip after the cutter has severed a section of wire, for the purpose set forth.

4. In a wire stitching machine, the combination with the clencher block holder of the table supporting mechanism having a shank and support in which said shank is adjustably mounted, of an eccentric mounted on a shaft journaled in said support, an incline on said shank to contact with the eccentric, and means for firmly securing said eccentric in any of its adjusted positions, for the purpose set forth.

5. In a wire stitching machine, the combination with the table supporting mechanism, of an eccentric having an enlarged flange, a shaft for said eccentric, a support in which the shaft is journaled, an incline wall on the table support to contact with the eccentric, and means for securing said eccentric and its shaft firmly against rotation in any of the adjusted positions of said eccentric, for the purpose set forth.

6. In a wire stitching machine, table operating mechanism comprising an eccentric having an enlarged flange with graduations thereon, a shaft for the eccentric and a support in which the shaft is journaled, means for rotating the shaft and eccentric, a table support having an incline surface to contact with the eccentric, and means for securing said shaft, for the purpose set forth.

7. In a wire stitching machine, the combination with the clencher-block holder of the table supporting mechanism having a shank and a support in which said shank is adjustably mounted, of a shaft journaled in the support, an eccentric mounted on the shaft and having an enlarged graduated flange, the shank having an incline to contact with the eccentric, and means for securing said flange firmly to said support, for the purpose set forth.

8. In a wire stitching machine, the combination with the clencher-block holder of the table supporting mechanism having a shank and a support in which said shank is adjustably mounted, of a shaft journaled in the support, an eccentric mounted on the shaft, the shank having an incline to contact with the cam, means for holding a book comprising the lip 91 of shank support and the lug 92 secured to the shank, and means for clamping the eccentric shaft against rotation, for the purpose set forth.

9. In a wire stitching machine, the combination with wire feeding mechanism, of a supported rod, a longitudinally movable and non rotatable sleeve mounted thereon, a reel rotatably mounted on the sleeve and under tension, for the purpose set forth.

10. In a wire stitching machine, the combination with wire feeding mechanism, of a supported rod, a sleeve having a longitudinal movement thereon, means to prevent rotation, means to reduce friction in its longitudinal movements, a friction controlled reel mounted on the sleeve, means to regulate the friction, for the purpose set forth.

Signed at New Haven in the county of New Haven and State of Connecticut this 24th day of May A. D. 1906.

REUBEN H. BROWN.

Witnesses:
FRANK K. LOVELAND,
J. B. COOK.